US005178063A

United States Patent [19]

Wolfberg et al.

[11] Patent Number: 5,178,063

[45] Date of Patent: Jan. 12, 1993

[54] METHOD AND APPARATUS FOR AUTOMATIC NUMBERING OF FORMS ON A ROTARY PRINTING PRESS

[75] Inventors: Larry Wolfberg, Honolulu, Hi.; John Harper, Wichita, Kans.

[73] Assignee: L & C Family Partnership, Honolulu, Hi.

[21] Appl. No.: 526,763

[22] Filed: May 23, 1990

Related U.S. Application Data

[63] Continuation of Ser. No. 281,062, Dec. 7, 1988, abandoned, which is a continuation-in-part of Ser. No. 942,324, Dec. 16, 1986, Pat. No. 4,827,315.

[51] Int. Cl.⁵ .......... B41J 45/00; G01D 9/00

[52] U.S. Cl. .......... 101/76; 101/92; 101/226; 400/118; 400/63; 400/583.2; 346/23; 346/76 L; 346/93; 364/471; 341/3; 341/13; 235/433; 250/548; 250/570; 250/571

[58] Field of Search .......... 101/216, 226, 72, 76, 101/77-79, 235, 92, 486, 489; 400/118, 583.2, 583.3, 63; 341/13, 1, 3, 9, 15, 16; 346/21, 93, 76 L; 364/406, 469, 471, 518; 235/433; 250/566, 570, 571, 548, 233, 237 G

[56] References Cited

U.S. PATENT DOCUMENTS

| | | | |
|---|---|---|---|
| 2,962,705 | 11/1960 | Relis et al. | 341/16 |
| 3,196,279 | 7/1965 | Papelian | 250/570 |
| 3,204,236 | 8/1965 | Duris et al. | 341/3 |
| 3,458,706 | 7/1969 | Ravenhall et al. | 250/570 |
| 3,576,367 | 4/1971 | Sable . | |
| 3,628,026 | 12/1971 | Cronin | 250/237 G |
| 3,657,707 | 4/1972 | McFarland et al. | 346/76 L |
| 3,701,996 | 10/1972 | Perley . | |
| 3,833,795 | 9/1974 | Shoshani et al. | 101/72 |
| 3,857,471 | 12/1974 | Hoffman et al. | 400/583.2 |
| 3,898,670 | 8/1975 | Erikson et al. | 346/21 |
| 4,031,519 | 6/1977 | Findley | 400/63 |
| 4,084,140 | 4/1978 | Cauldwell | 250/570 |
| 4,103,155 | 7/1978 | Clark | 250/231 SE |
| 4,207,814 | 6/1980 | Schenk | 101/76 |
| 4,258,113 | 3/1981 | Kuehnle . | |
| 4,286,031 | 8/1981 | Kuehnle et al. | 101/216 |
| 4,297,022 | 10/1981 | Lester | 400/118 |
| 4,297,716 | 10/1981 | Hirayama et al. . | |
| 4,321,606 | 3/1982 | Lazzari | 400/118 |
| 4,328,746 | 5/1982 | Eglowstein et al. | 101/72 |
| 4,328,749 | 5/1982 | Inouye et al. | 400/118 |
| 4,334,471 | 6/1982 | Noyes et al. | 101/235 |
| 4,392,205 | 7/1983 | Makizuka et al. | 364/518 |
| 4,406,939 | 9/1983 | Golker | 346/76 L |

(List continued on next page.)

FOREIGN PATENT DOCUMENTS

| | | | |
|---|---|---|---|
| 0255081 | 2/1988 | European Pat. Off. . | |
| 0277036 | 8/1988 | European Pat. Off. . | |
| 64427 | 6/1978 | Japan | 101/72 |
| 0043536 | 3/1980 | Japan | 235/433 |
| 58-49284 | 3/1983 | Japan . | |
| 0063882 | 4/1984 | Japan | 346/76 L |
| 0017052 | 1/1988 | Japan | 346/76 L |
| 1190521 | 11/1985 | U.S.S.R. | 341/13 |

OTHER PUBLICATIONS

"Automatic Code Generator" IBM Technical Discl. Bulletin, vol. 16, No. 9, Feb. 1974 pp. 3012-3013.
Leibinger Roberts, Inc. publication, p. 1, May, 1988.
Atlantic/Force Spec. Sheet, "Rotary Head Skip Wheel Chart", p. 59, May, 1988.

(List continued on next page.)

*Primary Examiner*—Eugene H. Eickholt
*Attorney, Agent, or Firm*—Banner, Birch, McKie & Beckett

[57] ABSTRACT

Computer controlled numbering of consecutive business forms is provided for both computer controlled presses and in the form of a retrofit unit for conventional rotary presses. The retrofit unit includes a disk provided with radially oriented metallic strips of predetermined locations on the disk, and mounted on a suitable shaft of the press. The disk cooperates with a stationary transducer mounted, for example, on a stationary press wall to send signals to the control unit to fire the printer.

17 Claims, 5 Drawing Sheets

U.S. PATENT DOCUMENTS

| | | | |
|---|---|---|---|
| 4,484,809 | 11/1984 | Coleman . | |
| 4,495,582 | 1/1985 | Dessert et al. | 364/469 |
| 4,512,256 | 4/1985 | Schriber et al. . | |
| 4,514,819 | 4/1985 | Punater et al. | 364/471 |
| 4,519,700 | 5/1985 | Barker et al. | 346/76 L |
| 4,574,237 | 3/1986 | Hachetel et al. | 324/173 |
| 4,591,880 | 5/1986 | Mitsuka | 346/76 L |
| 4,600,296 | 7/1986 | Hage . | |
| 4,603,336 | 7/1986 | Dufour et al. . | |
| 4,604,725 | 8/1986 | Davies et al. | 250/233 |
| 4,606,955 | 8/1986 | Eastman et al. . | |
| 4,609,277 | 9/1986 | Yokoyama et al. . | |
| 4,630,919 | 12/1986 | Fantuzzo et al. . | |
| 4,641,828 | 2/1987 | Yajima | 271/227 |
| 4,659,924 | 4/1987 | Tokunaga | 250/231 SE |
| 4,661,697 | 4/1987 | Takahashi et al. | 250/233 |
| 4,668,072 | 5/1987 | Yasuda . | |
| 4,673,303 | 6/1987 | Sansone et al. | 346/21 |
| 4,674,858 | 6/1987 | Nagayama . | |
| 4,711,562 | 12/1987 | Pothast et al. . | |
| 4,719,419 | 1/1988 | Dawley . | |
| 4,756,992 | 7/1988 | Cheng . | |
| 4,758,486 | 7/1988 | Yamazaki et al. . | |
| 4,761,669 | 8/1988 | Langdon . | |
| 4,769,672 | 9/1988 | Hoshi et al. . | |
| 4,772,253 | 9/1988 | Koizumi et al. . | |
| 4,788,572 | 11/1988 | Slayton et al. . | |
| 4,791,450 | 12/1988 | Mosehauer et al. . | |
| 4,794,421 | 12/1988 | Stoudt et al. . | |
| 4,806,751 | 2/1989 | Abe et al. | 250/231 SE |
| 4,806,972 | 2/1989 | Tomoyori et al. . | |
| 4,809,040 | 2/1989 | Regnault et al. . | |
| 4,810,604 | 3/1989 | Schmidlin . | |
| 4,839,814 | 6/1989 | Steidel | 364/469 |
| 4,847,775 | 7/1989 | Roch et al. | 364/469 |
| 4,874,919 | 10/1989 | Bransden et al. | 346/76 L |

OTHER PUBLICATIONS

Atlantic/Force, "OCR Numbering Equipment", p. 11, May, 1988.
Atlantic/Force, "Functions of Modulus Check Digit Systems", p. 31, May 1988.
Atlantic/Force, "CAMS", p. 29, May, 1988.
Fernseh & Kino Technik, vol. 36, No. 9, Sep. 1982, pp. 345-350, F. Menzel, "Rechnergestutzte Lichtbestimmung und Steurung von Farbkopiermaschinen".

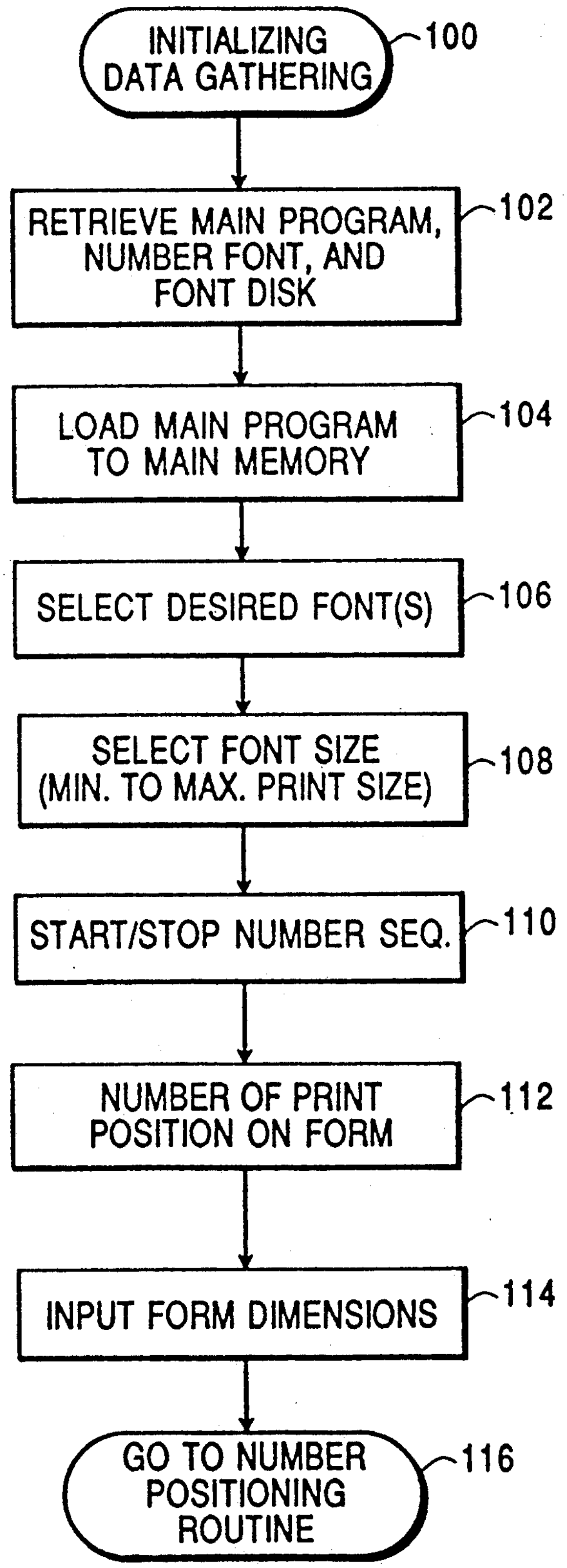
INITIALIZING DATA GATHERING
100
RETRIEVE MAIN PROGRAM, NUMBER FONT, AND FONT DISK
102
LOAD MAIN PROGRAM TO MAIN MEMORY
104
SELECT DESIRED FONT(S)
106
SELECT FONT SIZE (MIN. TO MAX. PRINT SIZE)
108
START/STOP NUMBER SEQ.
110
NUMBER OF PRINT POSITION ON FORM
112
INPUT FORM DIMENSIONS
114
GO TO NUMBER POSITIONING ROUTINE
116

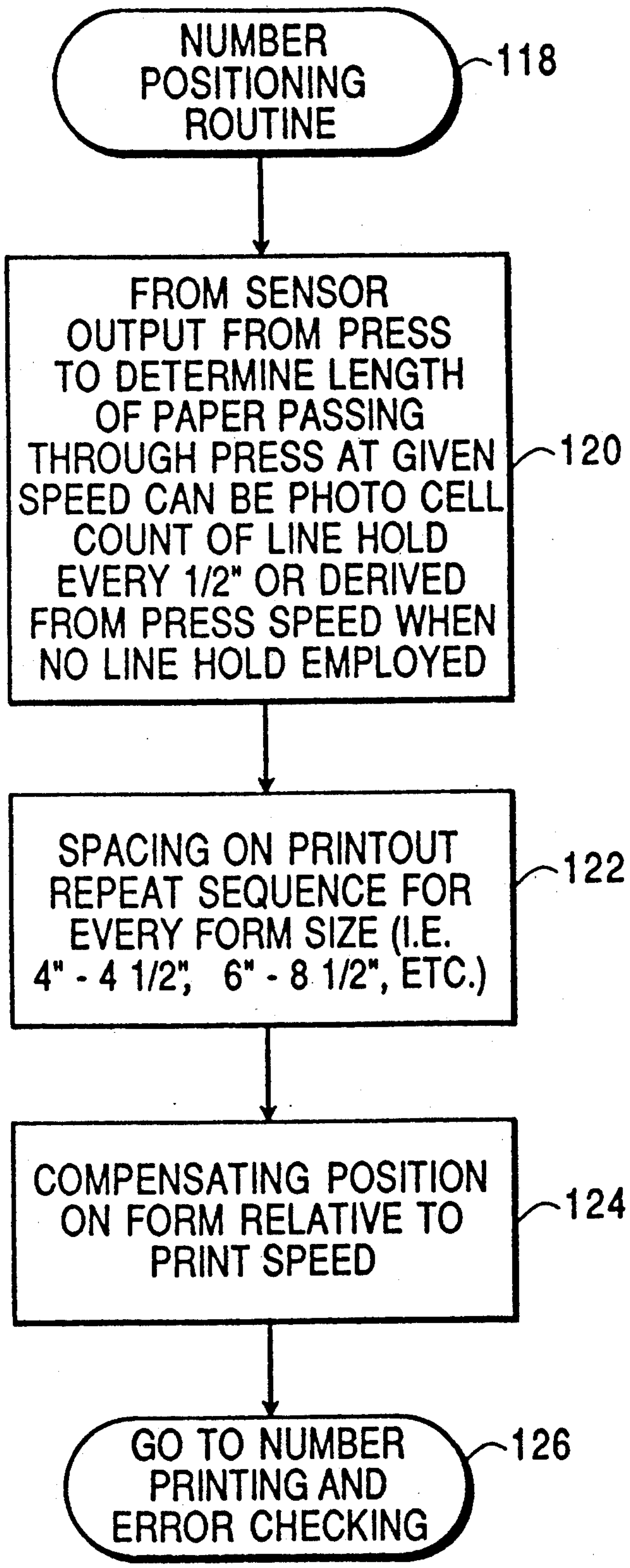
NUMBER POSITIONING ROUTINE
118
FROM SENSOR OUTPUT FROM PRESS TO DETERMINE LENGTH OF PAPER PASSING THROUGH PRESS AT GIVEN SPEED CAN BE PHOTO CELL COUNT OF LINE HOLD EVERY 1/2" OR DERIVED FROM PRESS SPEED WHEN NO LINE HOLD EMPLOYED
120
SPACING ON PRINTOUT REPEAT SEQUENCE FOR EVERY FORM SIZE (I.E. 4" - 4 1/2", 6" - 8 1/2", ETC.)
122
COMPENSATING POSITION ON FORM RELATIVE TO PRINT SPEED
124
GO TO NUMBER PRINTING AND ERROR CHECKING
126

METHOD AND APPARATUS FOR AUTOMATIC NUMBERING OF FORMS ON A ROTARY PRINTING PRESS

This application is a continuation of application Ser. No. 07,281,062, filed Dec. 7, 1988 and now abandoned, which in turn is a continuation-in-part of applicant's co-pending application Ser. No. 06/942,324 filed Dec. 16, 1986 now U.S. Pat. No. 4,827,315.

BACKGROUND AND SUMMARY OF THE INVENTION

In considering the use of electronic or digitalized information to operate a printing press, it is necessary to recognize the difference between this type of application and the requirements of a normal computer print out by means of chain printers, wire printers, etc.

In the case of the standard computer printout, the information is almost 100% variable, whereas on the printing press in accordance with this application, the information divides into two categories: fixed and variable.

Fixed information can be defined as that digitalized information comprising the construction of the business form itself and does not vary throughout the length of the run on the press; i.e., 10,000 singles would print 10,000 identical forms or a two- or three-part set would print slightly different copy on each part, but the information would be fixed throughout the run of each part.

The variable information would consist of numbers, bar coding, screens, overlays, blockouts, and any other minor variations from the "fixed data" which might be required for the run, contrasting to the unchanging information.

This invention relates generally to the manufacture of business forms and, particularly, to computer controlled apparatus for applying "variable information", i.e., consecutively numbering the forms in a continuous web.

The apparatus of this invention comprises a portable unit, useable with the older conventional rotary printing presses, as well as newer, automatic and computer controlled presses. One such computer controlled press is disclosed in applicant's co-pending parent application Ser. No. 06/942,324, now U.S. Pat. No. 4,827,315 the entirety of which is hereby expressly incorporated by reference.

In the commercial printing field, consecutive numbering does not present a very onerous problem, and even on occasions where commercial printers might need to consecutively number a form, the machines that are used are comparatively simple and reliable. These machines, known as "consecutive machines", are plunger activated during printing, and the plunger acts to turn the numbering units one digit each time it is actuated. Apart from problems which may occur as a result of poor maintenance or excessive ink accumulation, these machines do not generally experience mechanical or technical problems of any significance.

In the business forms industry, however, a completely different and extremely complex set of problems present themselves. For example, on a 17" rotary press printing two 8½" forms, a pair of numbering machines are set at "skip 2", i.e., one unit wheel is set at even and one at odd, each printing once every revolution of the print cylinder. Rather than plunger actuation as described above, these machines are operated by an arm which actuates a pawl within the machine, and the arm is driven by means of a cam mounted on the numbering shaft of the press. The cam is configured in such a way as to cause the actuated arm to operate once per revolution of the shaft, as the arm reaches the apex of the cam curve.

When dealing with more common multiple numbers, such as a 4" form printed on a 24" press, six numbering machines and are required, the unit wheels are set at "skip six". In this arrangement, the potential mechanical problems are multiplied by six. As will be appreciated, the time required to set the machines, to mount them on the press in proper sequence, and to insure they are operating correctly, is very costly and involves significant amounts of "make ready" time. When, as is often the case, there are two numbers per form, and given the form and cylinder size above, 12 numbering machines are required, which doubles again the complexity of the system and the attendant likelihood of significant down time.

It is essential for acceptable business forms production that numbering machines be maintained in exceptional working order. This, of course, requires that they be cleaned after each job, and particularly after a long run, since a certain amount of ink particles and lint from the paper can cause the machines to misfire.

When the machine does not sequence correctly, the pressman, or operator, may or may not be immediately apprised. If the problems occurs when the numbers are in the thousands field, a substantial number of forms can run before the problem is discovered, resulting in considerable waste.

Another problem associated with machines occurs when the machine is "half cocked", i.e., where the machine does not quite move into proper position, so that hundreds and even thousands of forms may be printed with only half the desired figure. When this occurs, the pressman must rerun that part of the job. An even more difficult situation is presented when the error is not discovered and, during the run, the machine corrects, so that, at the end of the run, the pressman has no way of knowing that hidden within the job is a large group of bad forms.

It is also not unusual to run this type of job with a multiplicity of numbering machines to which are added either 6 or 12 additional special numbering heads for MICR or optical scan. In such cases, as many as 24 or more machines must be dealt with, and because of space limitations, these machines cannot all be mounted on the same press shaft. Therefore, an additional shaft is required, increasing the likelihood that numbers will print out of sequence as a result of the overall complexity of the system.

It will therefore be appreciated that there is a tremendous investment involved in numbering machines in any business forms plant, particularly since it is not practical to change the skip wheels to suit the rotary print cylinder circumference for every job; therefore, most plants must have a multiplicity of numbering machines set to different skip positions. Occasionally, the numbering machines will be changed from one skip sequence to another in order to obtain sufficient machines to run the job. However, it must be remembered that in order for the numbering machines to print correctly, there must be symmetry between the circumference of the printing cylinder and the shape of the wheels of the numbering machine. It is possible, for example, to run a 17" machine on a 16–20" print cylinder. This is not advisable, however, since there is always the danger that a part of a figure may be left off. Conversely, while a 22" numbering machine can be used on 21-24" print cylinders, it will not operate correctly on a 26" or larger cylinder. Thus, quantity of numbering machines required in stock is a factor of both the number of different presses in a plant, and also the degree of interchangeability which exists between the presses and the numbering machines.

There are also known in the art special "Check Digit" machines, which have an extra wheel(s) and pawls at the right of the unit which operate on the basis of modulus numbering, e.g., Mod 7-9-11, etc. These machines are wholly unlike the standard numbering machines and are very complex to operate and set up. However, using a computer generated modulus drive in accordance with this invention would eliminate many problems and even allow for Modulus 10 which cannot be derived from any present mechanical machine.

When using conventional modulus machines, it is almost impossible for the press operator to check if the machines have malfunctioned and to determine that the modulus number is correct.

On the other hand, these modulus systems are inherently designed for computer checking, and it would be a relatively simple matter to provide the correct sequence to the print head from a computer drive program in accordance with this invention.

Another problem encountered in the forms industry is the prefix/suffix numbers or letters that are often required by the customer's system. This is an additional time consuming problem for the printer, and sometimes requires complete replacement of a printing plate to accommodate the various ancillary letters or numbers that may be required. With a computer controlled electronic system as provided by this invention, this problem is eliminated.

Accordingly, in one exemplary embodiment of the invention, a printing unit as described in applicant's co-pending parent application Ser. No. 06/942,324, now U.S. Pat. No. 4,827,315, is utilized to print consecutive numbers on a continuous web of business forms. The printing unit is, in turn, controlled by a program executed by a microcomputer such as an IBM PC which would have access to information regarding type style, number location on the form, number composition, and the like stored within an associated memory device. For example, a memory device associated with the PC contains the various known fonts and the computer program employs a selected font on demand.

A separate program within the PC also controls the starting numbering series, and where and how print will appear on the form itself. This program utilizes numbers, bar codes and a limited amount of alphabetical font availability, prefixes, etc., for special applications.

As already noted, the printing unit itself is preferably the same as that described in applicants' co-pending parent application Ser. No. 06/942,324, it being understood that all the various mechanisms presently available, from laser printing to ink jet printing to magnetic and LED printing may also be employed.

It is significant feature of this invention that the print unit may be an integral part of a computerized press of the type disclosed in applicants' aforementioned parent application, or it may be configured as a portable unit, readily adapted for retrofit to existing conventional rotary printing presses. In the built-in mode, the control program is part of the overall printing program, while in the portable mode, the unit includes its own computer and/or associated program. In this latter, or retrofit mode, an additional mechanism must be employed to trigger the computer at the required intervals. In an exemplary embodiment, a disk may be fitted to one of the "constants" available in the mechanical operation of any press, preferably the shaft used to provide the conventional ½" spacing on the line hole punch ring.

The disk itself may be constructed of a conventional plastic material, and Bakelite is especially suitable. While the disk itself is not required to drive any mechanism, Bakelite does have the capability of being used as a gear with inherent strength and lack of distortion. The disk may be mounted to the above mentioned hole punch shaft by any conventional means, but allowance for adjustable movement thereon should be provided.

In order to keep the program of the computer properly synchronized, transducer(s) are fitted to the press and are activated by metallic strips on the Bakelite wheel or disk. In the case of fixed size presses, these metallic strips may be permanently incorporated into the Bakelite disk and the transducers moved to pick up two-three-four around, etc. In the case of variable size presses, or where more numbers are required than can be provided by present-day equipment, the permanent actuating strips can be augmented by metallic foil as will be understood by those skilled in the art. Such foil is readily available and can be easily cut, stuck to the disk and removed when no longer needed. This is a fairly simple operation and it may be further facilitated by engraving certain known, fixed transducer trigger positions on the disk, so that the operator could immediately fasten extra foil tape in the indicated position(s) when required. The extension of this concept to a variable size press would include the use of one disk with metallic tape on both sides and the transducer itself would be mounted in accordance with the job, for use with one or both sides of the disk.

Since it is known from the revolutions of the line hole punch shaft how many inches of paper have passed through the machine, the placement of the metallic transducer strips will trigger a simple formula for any required program of sequential numbering.

In addition to, or in place of, the transducer strips, it will be understood that there may be a system of timing marks printed on the stub of the shaft which, when sensed by a photocell, would trigger the sequential program.

Since micro chips are now available that have the capability of containing all the information concerning various font design, etc., and synthesizing letter or number formation, it is further contemplated by the present invention to have the letter and/or number configurations stored in a micro chip plugged into the circuits and clearly marked for the press operator's benefit. This would eliminate searching for the program and subsequent transfer from disk to computer. This information would then be downloaded into the PC which would then process the sequential change of numbers.

In the portable, retrofit mode, the separate computer required may be of the medium power type since the computer will be called upon only to trigger the printing on a demand basis. In addition, the computer program in accordance with the invention is comparatively simple, particularly if all of the press and forms information is stored on a micro chip.

The invention as described herein has the following technical and commercial advantages over known numbering machines and techniques currently used in the business forms printing industry.

1. Elimination of the conventional procedures related to the mounting and setting of numbering machines, as well as elimination of the resetting of such machines when changing from roll to roll; also eliminated is the necessity for numbering resets where the numbering series is restricted by the customer, e.g., not to exceed 5–6 digits. This type of resetting will be controlled by the computer-based technology as disclosed herein.

2. Elimination of the multiplicity of different sizes and types of numbering machines presently required to handle the various configurations of forms; additionally, and even more importantly, the presently disclosed system will easily adapt to data processing systems even as they become more advanced in their use and application.

3. Elimination of the more complex numbering machines associated with numbering modulus systems. At present, a different set of machines is required for each of the mathematical systems used, such as Modulus 7, 9, 11. This invention will also enable the business forms manufacturer for the first time to use Modulus 10 which until this date has not been practical, using mechanically driven machines.

4. Due to the variety and constantly expanding use of bar coding, it is almost impossible for a manufacturer to carry all the expensive and complicated machines and cams required for this type of operation. There are many types of bar codes used, some of which are peculiar to a particular system, and the electronic printing system disclosed herein is adaptable at a minimum cost to handle any of the present or future bar coding requirements that doubtless will emerge.

5. Because of the size of present day numbering machines, there is a finite number of numbering units which can be mounted around a single shaft, thereby limiting the spacing between printed numbers. Dependent on the particular machine used, the minimum spacing is approximately 2" due to mounting arrangements. When the form requires this type of numbering, it is necessary to use two shafts, and the setting of numbers for this type of operation is extremely slow and onerous. The problems inherent in this operation will be eliminated by the present invention. The numbers can be as close together as required by the job specifications.

6. The banking industry presently employs magnetically encoded numbering on checks. There have been discussions within the American Banker's Association indicating that banks are becoming overwhelmed with the amount of checks that are being processed, in part because of the limitations of the magnetic encoding systems presently used to sort and read checks correctly. With the development of laser scanners such as those used at retail check out counters, it is apparent that banks could change from the magnetic encoding to a sequential numbering system (with fixed account numbers) which would be read by an adaptation of the laser scanner principle. It further apparent that in doing so, banks may abandon the familiar MICR E13B code type of numbers in the interest of a "user friendly" ability to read the bank code numbers. Should this occur, the investment required by the printing industry to convert to a different type of number consistent with a laser scanning system would be tremendous. However, utilizing the principles of the invention described herein, this would be a comparatively simple conversion.

It is further anticipated that the present invention will be adaptable to any configuration of numbering or coding that may be devised in the future.

Other objects and advantages of the present invention will become apparent from the detailed description of the invention which follows.

BRIEF DESCRIPTION OF THE DRAWINGS

FIGS. 5 through 7 illustrate in flow chart form the computerized control of business forms numbering in accordance with the invention.

DETAILED DESCRIPTION OF THE DRAWINGS

Figure 1:
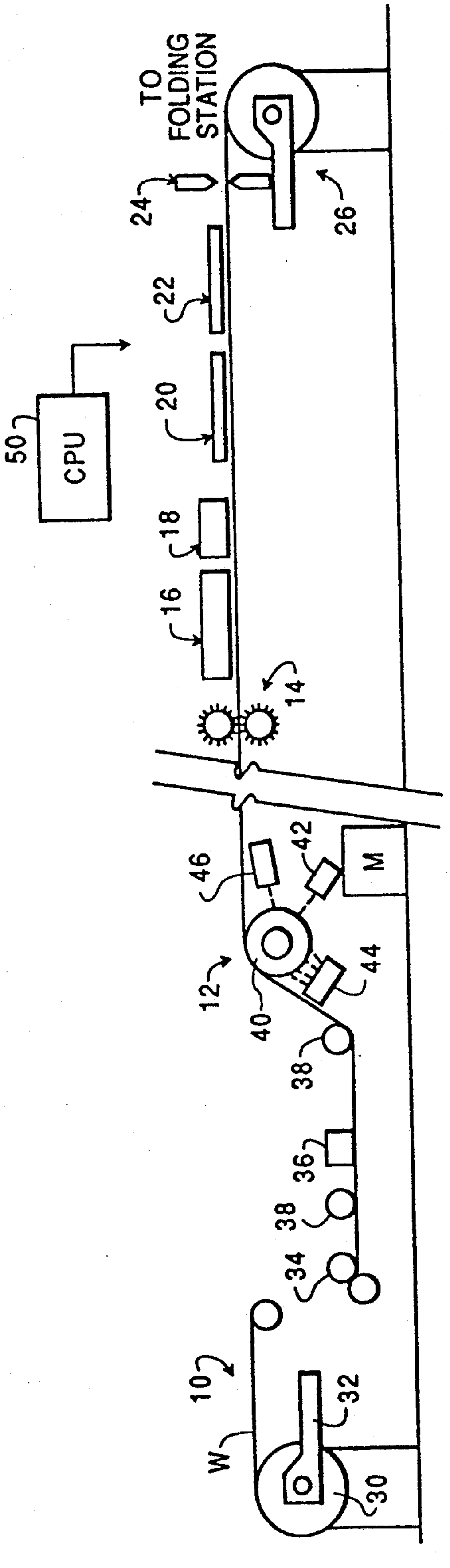
FIG. 1 is a side schematic of a computer controlled press in accordance with another exemplary embodiment of the invention.

Referring now to FIG. 1, a computerized business forms printing press of the type disclosed in our parent application Ser. No. 06/942,324 is shown in schematic form. In this first embodiment of the invention, the press itself is computer controlled and the numbering is applied sequentially to the forms at the print head, under the control of a program selected in accordance with the job requirements. The press includes an infeed supply station 10 for a web W, one or more print heads or stations 12, a line hole punch ring station 14, an image scanning station 16, a laser slitter station 18, a laser punch station 20, a laser cross perforation station 22, additional detectors 24 and a rewind station 26.

The infeed station 10 includes a conventional paper supply roll 30, provided with web guides 32 and feed rollers 34. In accordance with this invention, at least one laser detector 36 is provided for monitoring web thickness. While large variations in thickness are not normally found within a single paper roll, the second or third roll used in a process may, in fact, contain thickness variations large enough to create stretch problems in the web. The laser detector serves to alert the press operator of variations beyond a predetermined acceptable minimum so that the problem may be corrected. Detectors using laser radiation for measuring web thickness are not new per se. See, for example, U.S. Pat. No. 4,322,971 for a representative example of the type of detector which can be utilized in this invention. It is also understood that transducers are also available that can detect variations in thickness.

A pair of compensator rolls 38 are located on either side of the detector 36 and are employed in order to indicate slack and uneven feed of paper from the supply roll 30. These rolls are operatively connected with the central computer control unit which adjusts the infeed rolls 34 as required.

The printing station 12 includes a unique, "indeterminate length" printing cylinder 40 which enables printing of forms to any desired length or repeat. Each printing cylinder 40 (there may be as many as four or more arranged in series) is preferably constructed of aluminum and coated to provide a photoconductive surface for receiving an image from an image projector 42. The projector 42 utilizes lasers to project an image onto the photosensitive recording medium applied on the drum surface. In this regard, it is to be appreciated that the drum or cylinder at each printing station should be mounted for easy installation and removal so that the cylinder may be removed periodically for recoating.

In a manner understood by those in the art of laser technology, the printing stations will receive, for example, alpha and numeric character data in electronic form from the main computer control unit as described in further detail in our parent application, and in response to such data, print the desired characters on the moving web W. Each printing station 12 may have its own light motor drive M and its own computer (not shown). Each of these printing station computers may have its own program to control spacing and tension of the web in that particular station, but would, of course, interface with the main computer control program.

After the image is projected onto the photoconductive surface of the cylinder, a toner in the form of a powder is applied at 44. The powder should be extremely fine grained so that when it is picked up by the photoconductive surface, there is no waste or extraneous material thereon.

After the characters have been applied to the web W as the drum surface rotates into engagement therewith, the powder is fused and subsequently chilled.

As the drum continues to revolve, the image is erased by an ionized image eraser 46. Here again, lasers are utilized to discharge the photoconductive surface of the printing drums or cylinders as explained in the parent application.

After exiting the printing station, the web W passes through the conventional line hole punch ring station 14 and below the image scanner 16, and thereafter through the laser cross perforation cutter 22. The size, location, spacing, and so on of the various holes and slits is governed by the use of pre-programmed information on diskettes or cassettes, insertable in the main control unit as described in our parent application.

After passing between detectors 24, which insure proper alignment and tautness of the paper web W, the paper is rewound at a stand 26.

As will be appreciated, the various components of the press are connected via a cable (not shown) to the main central computer processing unit 50, which may comprise, for example, an IBM PC or other suitable hardware.

In accordance with this continuation-in-part application, the print head or station will automatically print consecutive numbers on consecutive forms within the web, under the control of a computer program selected in accordance with job requirements as described further below. As earlier indicated, when the press itself is computer controlled, the program which controls the numbering will be incorporated into the main control program.

Figure 2:
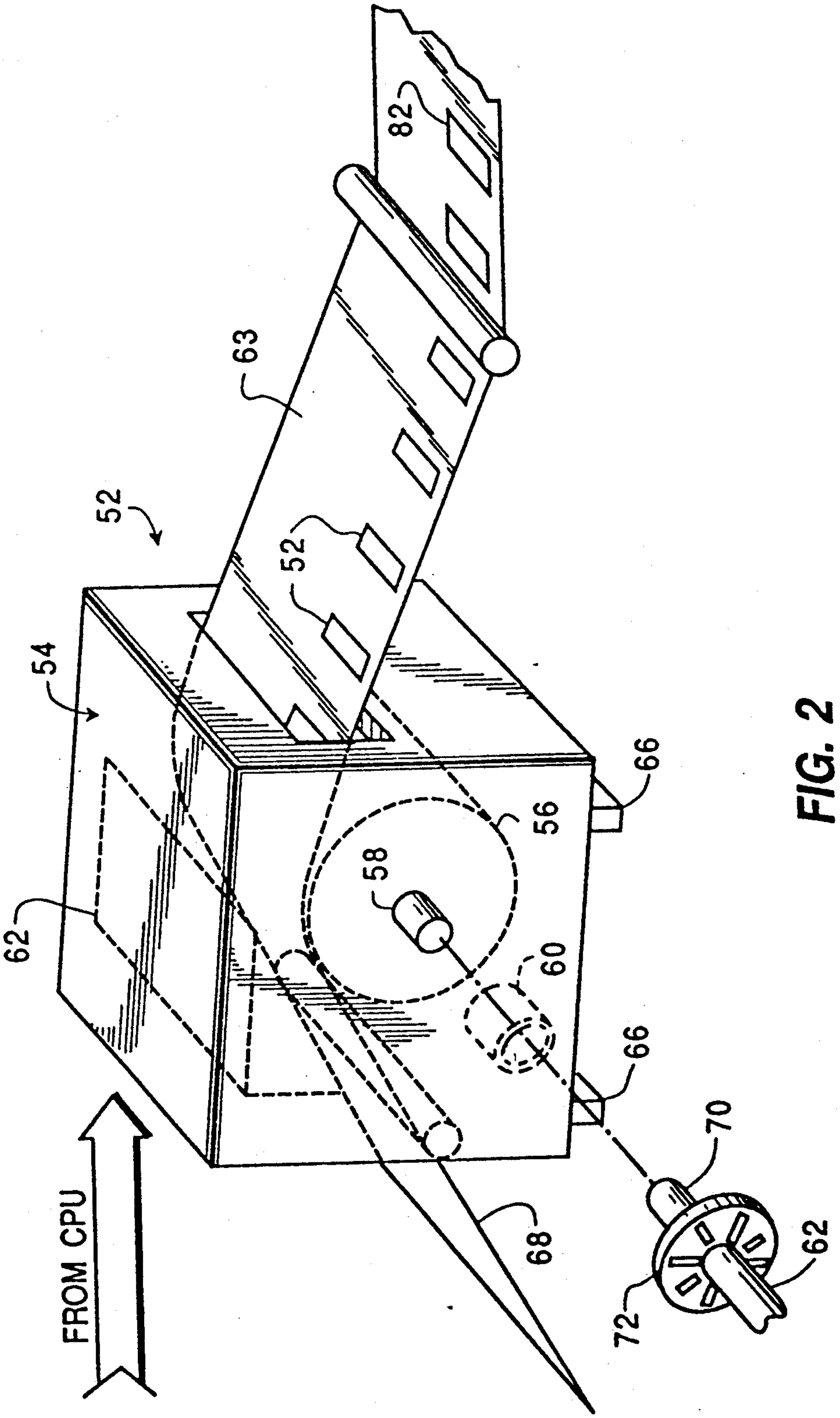
FIG. 2 is a perspective view of a retrofit numbering device in accordance with the invention.

With reference now to FIG. 2, a retrofit numbering tower or unit 52 is illustrated which is designed for use with conventional rotary presses. The unit includes a housing 54 which encloses and mounts a rotatable print cylinder 56 and associated shaft 58. The shaft 58 rotates with the cylinder and may be rotatably journaled in the housing walls in any conventional manner. Shaft 58, in turn, is coupled by any suitable means such as a coupling 60 (shown in phantom in FIG. 2), a belt drive, gear train or other suitable connection means, to the line hole punch shaft 62 of the press (or an extension thereof) or another of the press drive shafts.

Located in close proximity to the cylinder 56 is a print head 64 which may house a laser image projector, or an ink jet printer of the type described in the parent application for use in the printing station 12 of the computer controlled press also generally described above. It will be understood, however, that other printing techniques including magnetic and LED, may also be employed.

The housing is further provided with mounting blocks 66 which are shown only schematically. It will be understood that the blocks will vary in size and configuration to adapt the unit for mounting to the particular press construction. The mounting arrangement will serve to align the unit with or near the line hole punch shaft of the press (or an extension thereof, or another suitable press drive shaft) so that the unit can receive the continuous web 68 in its normal direction of movement in the press.

Figure 4:
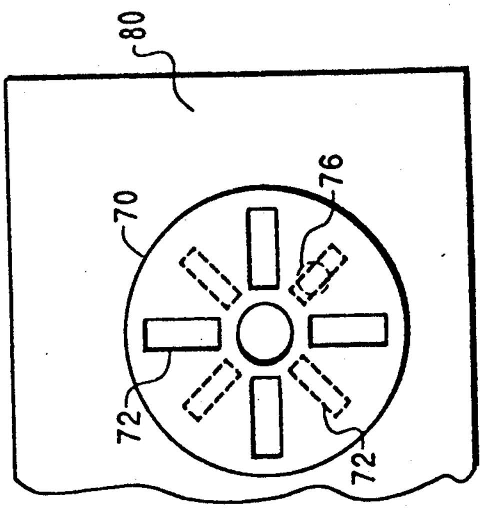
FIG. 4 is a partial side view showing the disk of FIG. 3 mounted on the side of a press.
Figure 3:
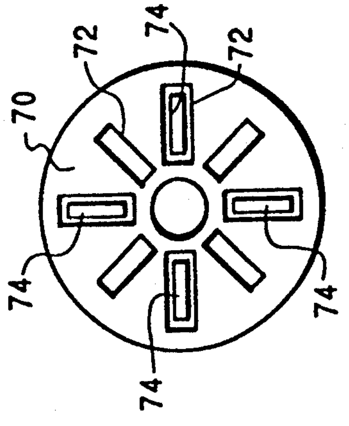
FIG. 3 is a side view of a disk for use with the retrofit device shown in FIG. 2.

A disc 70 is mounted on and for rotation with the shaft 62. The disc, as best seen in FIG. 3, comprises an annular member constructed preferably of Bakelite, although other suitable non-conducting materials may also be used, and provided on each side with a plurality of radially oriented depressions or grooves 72. The grooves or depressions are adapted to receive strips 74 of metallic tape or the like, which cooperate with one or more transducers 76 located on an adjacent press wall 80, as shown in FIG. 4.

The grooves or depressions 72 may be arranged to coincide with certain oft-used or standard lengths between numbers on consecutive forms, or between numbers on a single form. Thus, the press operator will, in accordance with instructions accompanying a particular form production run, place metallic strips 74 on the disc in the predetermined positions. In this way, each time a strip 74 passes the transducer 76, a signal is sent which results in a number 82 being printed on a form.

To increase the flexibility and versatility of the disc 70, the same or different pattern of depressions or grooves may be provided on the opposite face of the disc so that other numbering triggering sequences can be carried out.

It will be appreciated that the disk surfaces may also be configured to receive rigid metal strips, rather than flexible tape strips, if so desired, with or without the utilization of grooves or depressions in the disk surfaces.

In addition, since there may be many forms configurations to be run, and to the extent that a single disc cannot accommodate all of the various configurations, a number of discs may be used with the retrofit numbering tower, with metallic tape strips (or rigid metal strips) pre-applied for each changeover between runs.

Figure 7:
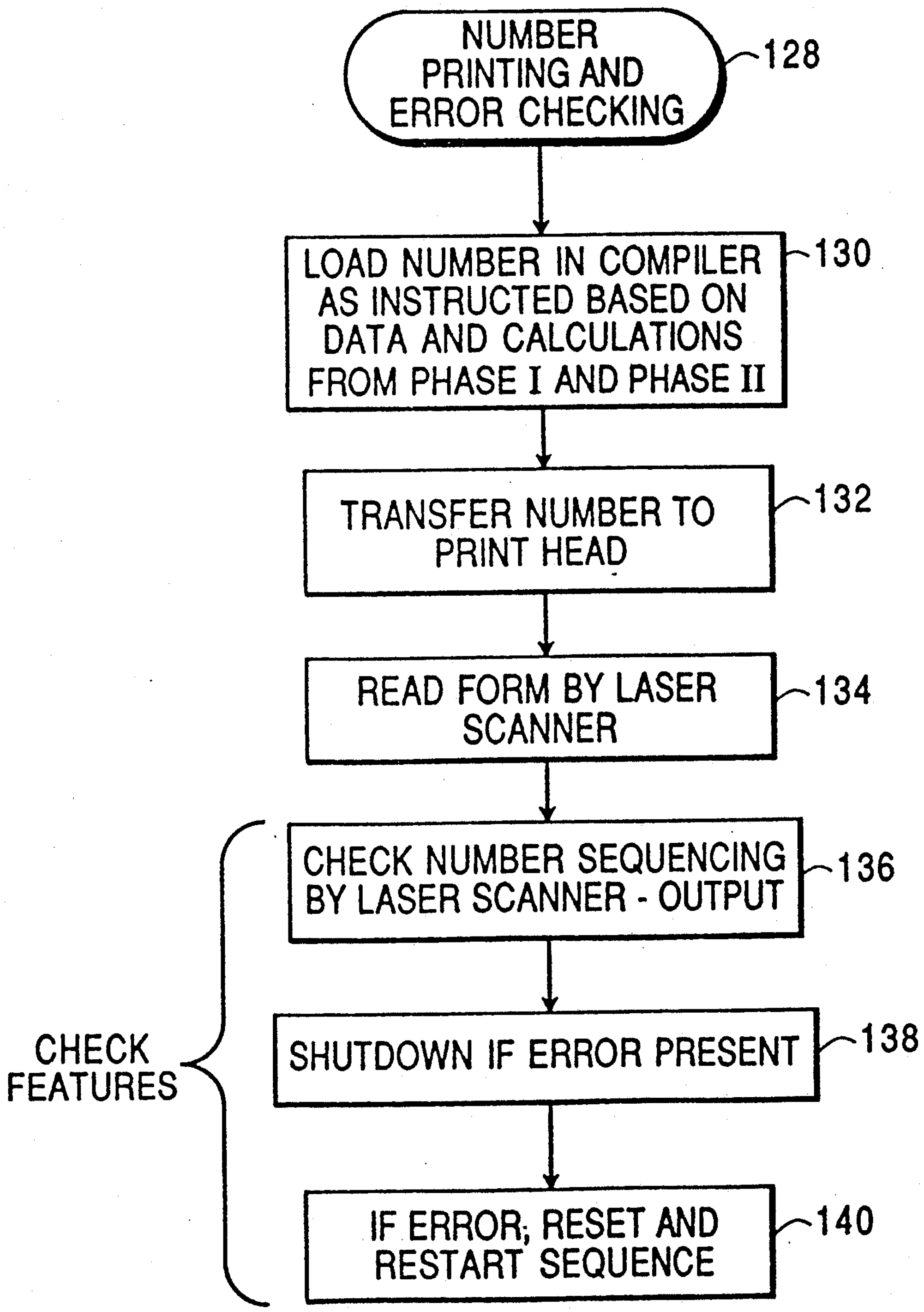

FIGS. 5 through 7 depict the computerized control of the number sequence in accordance with an exemplary embodiment of the present invention. Reference to business forms composition assumes the form itself is being composed and produced by a computer controlled press as described in applicants' parent application. It will be appreciated that for retrofit applications, only the numbering information processing steps apply.

Focussing first on FIG. 5, this figure schematically shows the initializing and data gathering steps involved in the computerized numbering control 100. Initially, as indicated at block 102, an operator retrieves a disk storing the main program to be executed by the PC controlling the form composition and/or number control processing, depending on whether a computer controlled or conventional rotary cylinder type press is being utilized. This disk in addition to storing the main program includes stored information defining the fonts to be utilized for printing both numbers and alphanumeric information on the business forms which are to be generated. After the disk is loaded, the main program is transferred to the business form composition and control computer's main memory so that it may be executed 104. The main program controlling the business form composition and the number sequencing is menu driven and prompts the operator to select such variable parameters as the desired font or fonts to be utilized in a business form 106. These menus are displayed to the operator via a conventional cathode ray tube (CRT) display (not shown). It is again noted that the parameters input during this process may be utilized both during the business form composition processing as well as the number sequencing and positioning processing, depending on whether the entire form production or only the numbering process is computerized. For purposes of the following discussion, it will be assumed that the entire forms production process is computer controlled.

After specifying the desired font or fonts, the operator selects, via a displayed menu, the style and font size to thereby define the minimum and maximum print sizes that are to be utilized in the business form. In this regard, it may be desirable to incorporate a wide range of different print sizes in a given business form 108.

The operator is then prompted by a displayed menu to enter the starting number in the business form sequence and the final number in the sequence 110. It is contemplated that the initially entered start and stop numbers only define a very short series of documents which are printed. These documents are then checked to determine that the number positioning on the form is satisfactory and that the business form generated is otherwise in accordance with design specifications. Once the operator determines that the initial business forms generated are satisfactory, the operator instructs the computer to initiate normal number sequencing by, for example, striking an appropriate control key on an associated with a conventional keyboard (not shown).

After the start/stop number sequence has been defined, a business form is then displayed on the CRT associated with the composition and numbering control computer. By, for example, manipulating the cursor via the keyboard, an operator defines the positions on the form that the number is designed to be placed 112. After indicating the position of numbers to be printed on the form, the operator is then prompted to input the form dimensions so that, for example, the processor is informed as to the precise length of the business form to be generated 114. Thereafter, the routine branches to the number positioning routine 116 shown in FIG. 6.

Turning to FIG. 6, after entering the number positioning routine 118, the processor must determine precisely when to advance from the start number entered at block 110 in FIG. 5 to the next number in the sequence. In order to determine the exact length of the form, the processor utilizes the output from the sensor on the press described above, to determine the length of the paper passing through the press at a given speed. In practice, this determination may be made by a count of every line hole in the business form as determined, for example, by a photocell output. In this regard, if it is known that line holes on a business form are spaced, for example, every half inch apart, the length of the business form may be readily determined. Alternatively, the length of the paper may be derived from sensed data relating to the press speed and by detecting the beginning and ending locations of each form 120.

Based on the input information regarding the desired form dimensions, e.g., form length, specified at block 114 of FIG. 5, and the number of print positions on a particular form as indicated at block 112 of FIG. 5, the processor determines the number repeat sequence for the form size being utilized 122. The system checks the input information from phase one with the actual sensed information as per block 120 to insure that a correct printout repeat sequence will be generated.

After the determination of the numbering repeat sequence, the system monitors the print speed and determines whether the number positioning must be adjusted to compensate for the current print speed 124. In this fashion, the processor insures that variations in print speed do not result in a number being printed outside the predetermined specified areas on the form. Thereafter, the number position routine branches to the number printing and error checking routine 126 shown in FIG. 6.

Turning next to FIG. 7, after entry into the number printing and error checking routine 128, the numbers to be printed on the business form are loaded into a compiler buffer for printing by the print head(s) at the appropriate time based on data and calculations made during the phase one and phase two processing 130. In regard to the number printing and error checking routine, in the present exemplary embodiment, it is presumed that the form has already been printed under the control of the processor except for the form numbering data.

It is noted that, if desired, the processor may be controlled to effectively make multiple copies of the same form by repeating the same number on a basic standard form. Additionally, if desired, copies may be labelled office copy, customer copy, etc. The numbering data loaded into the compiler buffer representing the number to be printed reflects, for example, the desired font style and font size input during the phase one processing.

Thereafter, the number loaded into the buffer is transferred to the print head for printing at times controlled by the processing in phase two so as to accurately position the numbers on the form 132. The business form with the number printed is then read by the system's laser scanner 134. The output from the laser scanner is monitored by the processing routine to insure that the number sequencing and positioning are correct 136. If the check at block 136 indicates that an error is present, then the printer shuts down 138. Additionally, upon detection of an error, the system is reset and a system restart sequence is thereafter initiated whereby the operator is requested to reenter the data input during the phase one processing (e.g., beginning with the selection of the desired fonts at block 106).

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. Apparatus for use with a printing press to serialize documents to be printed such as business forms, the serializing resulting in consecutively printed documents bearing sequential images such as sequential numerical images, the serializing apparatus characterized by computer control means, responsive to user control, for generating sequential image data for consequently generating the sequential images, the image data determining a font, a style, a font size, a location on the documents, and an image composition, at least one stationary transducer, and printing means, responsive to the generated image data, for consecutively printing the sequential images on consecutive documents produced by the printing press in accordance with the image data, the printing means being controlled by said computer control means and adapted for operation by a drive shaft of the printing press, the printing means including a rotary print cylinder mounted on the drive shaft of the printing press, a driven shaft connected to the drive shaft of the printing press by coupling means, and a disk mounted on the driven shaft, the disk for actuating the computer control means at predetermined intervals, the disk being constructed of electrically insulative material and provided with metallic elements on at least one face thereof, the metallic elements for cooperating with the at least one stationary transducer as the disk rotates with the driven shaft, wherein the metallic elements of the disk comprise metallic tape strips.

2. The serializing apparatus according to claim 1, the computer control means being actuable to select the font, a starting sequential image, and the sequential image location on each consecutive document.

3. The serializing apparatus according to claim 1 wherein the drive shaft of the printing press particularly comprises a line hole punch shaft of the printing press.

4. The serializing apparatus according to claim 1 adapted for operation with a plurality of n printing presses, n representing the number of printing presses, the computer control means being actuable to select a starting number and the image composition data particularly comprising "skip n" data determined from the starting number.

5. The serializing apparatus according to claim 1 wherein the predetermined intervals correspond to spacing between locations of numeric images on consecutively printed forms.

6. The serializing apparatus according to claim 1 wherein the disk is provided with a plurality of radially aligned depressions on the at least one face, each of which being adapted to receive one flexible metallic tape strip.

7. The serializing apparatus according to claim 1 wherein the image data further determines a numbering scheme and the computer control means is operable to select the image data including the numbering scheme, the type style, and the location of the printed numbers on the consecutively printed business forms.

8. A portable printing unit for electronically serializing business forms for use with a printing press having a drive shaft, the serializing resulting in the printing of sequential images such as numerical images on consecutively printed business forms printed on a continuous web, the portable printing unit comprising:

a rotary printing cylinder operatively connected to the drive shaft of the printing press;

projection means for projecting the sequential images onto the rotary printing cylinder;

transfer means for transferring the sequential images onto the web;

erase means for erasing the sequential images from the rotary printing cylinder immediately after each sequential image is transferred to the web;

computer control means for generating sequential image data determining a font, a type style, a font size, an image location and an image composition for controlling the projection means to consecutively print the sequential images on the consecutively printed business forms, a stationary transducer mounted on the printing press, and a disk operatively connected to the drive shaft of the printing press for actuating the computer control means at predetermined intervals, the disk being mounted for rotation on the drive shaft of the press, the disk being provided with a plurality of flexible, metallic tape strips about the periphery thereof and cooperating with the stationary transducer mounted on the press, the disk being provided with a plurality of radially aligned depressions on at least one face, each of which being adapted to receive one flexible metallic tape strip.

9. The portable printing unit according to claim 8 wherein the disc comprises two faces, both faces of the disk being provided with the plurality of radially aligned depressions.

10. A portable printing unit for electronically serializing business forms for use with a printing press having a drive shaft, the serializing resulting in the printing of sequential images such as numerical images on consecutively printed business forms printed on a continuous web, the portable unit comprising:

a rotary printing cylinder operatively connected to the drive shaft of the printing press;

projection means for projecting the sequential images onto the rotary printing cylinder;

transfer means for transferring the sequential images onto the web;

erase means for erasing the sequential images from the rotary printing cylinder immediately after each sequential image is transferred to the web;

computer control means for generating sequential image data determining a font, a type style, a font size, an image location and an image composition for controlling the projection means to consecutively print the sequential images on the consecutively printed business forms, a stationary transducer mounted on the printing press, and a disk operatively connected to the drive shaft of the printing press for actuating the computer control means at predetermined intervals, the disk being mounted for rotation on the drive shaft of the press, the disk being provided with a plurality of metallic elements about the periphery thereof and cooperating with the stationary transducer mounted on the press, wherein the metallic elements particularly comprise flexible metallic tape strips.

11. The portable printing unit according to claim 10 wherein the image data further determines a numbering scheme and the computer control means is operable to select the image data including the numbering scheme, the type style, and the location of the printed numbers on the consecutively printed business forms.

12. The portable printing unit according to claim 10 and further comprising a housing enclosing the portable unit and coupling means for mounting the portable unit on the printing press.

13. The portable printing unit according to claim 10 wherein the predetermined intervals correspond to spacing between locations of numeric images on consecutively printed forms.

14. The portable printing unit according to claim 10 wherein the disk is constructed of electrically insulative material.

15. The portable printing unit according to claim 10, the computer control means being actuable to select the font, a starting sequential image, and the sequential image location on each consecutive document.

16. The portable printing unit according to claim 10 wherein the drive shaft of the printing press particularly comprises a line hole punch shaft of the printing press.

17. The portable printing unit according to claim 10 adapted for operation with a plurality of n printing presses, n representing the number of printing presses, the computer control means being actuable to select a starting number and the image composition data particularly comprising "skip n" data determined from the starting number.

* * * * *